US009006926B2

(12) United States Patent
Hyde et al.

(10) Patent No.: US 9,006,926 B2
(45) Date of Patent: Apr. 14, 2015

(54) SYSTEMS AND METHODS FOR CONTROLLED STARTUP OF ELECTRICAL DEVICES LOADING A POWER LINE (75) Inventors: Roderick A. Hyde, Redmond, WA (US); Jordin T. Kare, Seattle, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 908 days.

(21) Appl. No.: 13/135,320

(22) Filed: Jun. 29, 2011

(65) Prior Publication Data
US 2013/0002020 A1 Jan. 3, 2013

(51) Int. Cl.
H02J 3/14 (2006.01)

(52) U.S. Cl.
CPC ............ *H02J 3/14* (2013.01); *Y02B 70/3225* (2013.01); *Y02B 70/3266* (2013.01); *Y04S 20/222* (2013.01); *Y04S 20/242* (2013.01)

(58) Field of Classification Search
CPC ......... H02J 3/14; H02J 2003/143; H02J 1/14; Y02B 70/3225; Y02B 70/3266; Y02B 60/1278; Y02B 60/1282; Y04S 20/222; Y04S 20/242

USPC ................................................... 307/39, 130
See application file for complete search history.

(56) References Cited

U.S. PATENT DOCUMENTS

| 4,421,992 | A | 12/1983 | Hibbard et al. |
| 4,617,472 | A | 10/1986 | Slavik |
| 5,818,821 | A | 10/1998 | Schurig |
| 6,741,442 | B1 | 5/2004 | McNally et al. |
| 7,606,552 | B2 | 10/2009 | Orr et al. |
| 7,894,219 | B2 | 2/2011 | Zong et al. |
| 2006/0095164 | A1* | 5/2006 | Donnelly et al. ............. 700/295 |
| 2008/0077336 | A1 | 3/2008 | Fernandes |
| 2008/0201595 | A1 | 8/2008 | Kawasaki |

OTHER PUBLICATIONS

PCT International Search Report; International App. No. PCT/US2012/044951; Sep. 13, 2012; pp. 1-2.

* cited by examiner

*Primary Examiner* — Carlos Amaya
(74) *Attorney, Agent, or Firm* — Foley & Lardner LLP (57) ABSTRACT

An electrical system having a plurality of devices is supplied with power by a common power supply line. One of the devices has a circuit that slows or delays device startup or activation in response to a signal indicative of power demand, draw or use by another of the plurality of devices supplied with power by the common power supply line.

20 Claims, 6 Drawing Sheets

310
Dynamically sense properties of a power supply line for the device

320
In response to a sensed voltage drop on the power supply line at or about device startup or activation and/or about a peak power draw by the device from the power supply line,
slow or delay device startup or activation in response to a sensed voltage drop on the power supply line at or about device startup or activation and/or about a peak power draw by the device from the power supply line

610
In an electrical system having a plurality of electrical devices coupled to a power supply line,
generate a signal indicative of dynamic power demand, draw or use by a first device

---

620
Regulate or control power use by a second device according to the signal indicative of power demand, draw or use by the first device

SYSTEMS AND METHODS FOR CONTROLLED STARTUP OF ELECTRICAL DEVICES LOADING A POWER LINE

BACKGROUND

The present application relates, in general, to power management. In particular, the application relates to controlling power draw by electronic and/or electrical devices from a power line or grid.

Power usage by an electronic or electrical device (e.g., an electrical motor, a computer, a fluorescent lamp etc.) generally varies with the operational mode or state of the device. For example, the electrical or electronic device (hereinafter collectively "electronic device") may have a higher power demand or consumption in startup mode than during steady state operation. The device may exhibit a peak level of power consumption in the startup mode. The device may also exhibit a similar peak level of power consumption in shutdown mode. The peak power demand placed by the device on the power line may be significantly greater that the operational steady-state power demand. The power line or grid may be overdesigned to have a supply capacity sufficient to accommodate the peak power demand of the device (which typically may be substantially greater than the operational steady-state power load). However, when a plurality of devices (e.g., in industrial or household settings) are powered by the same power line or grid, concurrent peak loading by the devices may exceed the supply capacity of the power line of grid and lead to device and/or system failures.

Consideration is now being given to managing power demands or loads placed on a supply power line or grid. In particular, consideration is now being given to solutions for controlling startup or other modes of operation of devices to regulate power demands placed on supply power line or grid. Some such solutions may allow power demand/consumption by the devices to be staggered so that the total power demand does not exceed the instantaneous supply capacity of the power line or grid.

SUMMARY

Approaches to managing power draw by a plurality of electrical/electronic devices coupled to a power line or grid are provided.

In one approach, an electrical device includes a device startup or activation circuit. A power line sensor is coupled to the device startup or activation circuit. The power line sensor is configured to dynamically sense properties of a power supply line for the device. The device startup or activation circuit is configured to slow or delay device startup or activation when the power line sensor senses a voltage drop on the power supply line.

In another approach, an electrical system includes a plurality of electrical devices coupled to a power supply line. A first of the electrical devices has a signal-generating circuit that generates a signal indicative of power demand or use by the first device. A second of the electrical devices coupled to the power supply line includes an activation or startup circuit, which is directly responsive to the generated signal indicative of power demand or use by the first device. The activation or startup circuit regulates or controls power use by the second device according to the signal indicative of power demand or use by the first device. The signal-generating circuit may, for example, emit a signal when the power demand or use by the first device exceeds a threshold value. In response, the activation or startup circuit may prevent or delay startup or activation of the second device. Additionally or alternatively, the activation or startup circuit may prevent or delay operation of the second device in a high-power mode while the signal indicative of power demand or use by the first device is at or above the threshold value.

BRIEF DESCRIPTION OF THE FIGURES

In the accompanying drawings.

Throughout the figures, unless otherwise stated, the same reference numerals and characters are used to denote like features, elements, components, or portions of the illustrated embodiments.

DESCRIPTION

In the following description of exemplary embodiments, reference is made to the accompanying drawings, which form a part hereof. It will be understood that embodiments described herein are exemplary, but are not meant to be limiting. Further, it will be appreciated that the solutions described herein can be practiced or implemented by other than the described embodiments. Modified embodiments or alternate embodiments may be utilized, in the spirit and scope of the solutions described herein.

Figure 1:
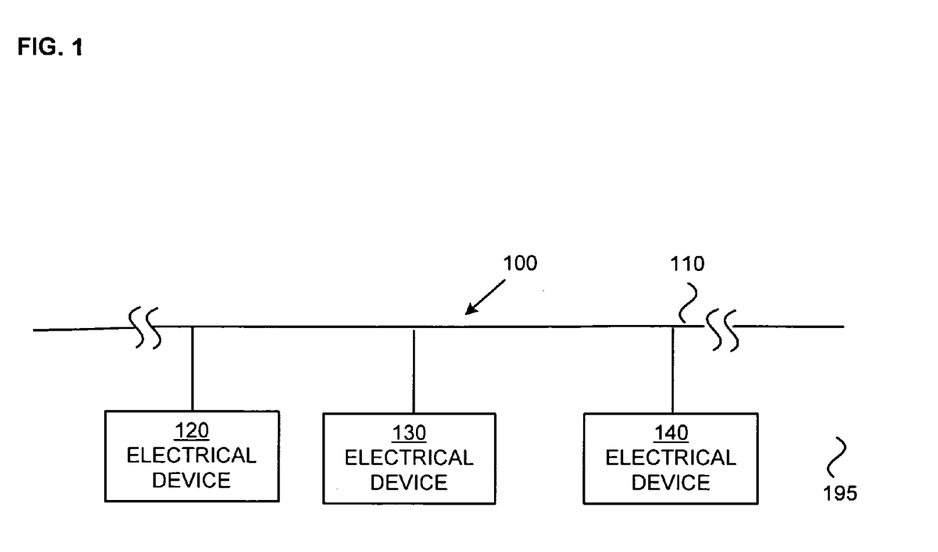
FIG. 1 is schematic illustration of a plurality of electrical/electronic devices connected to a power supply line.

FIG. 1 shows a plurality of electrical or electronic devices (e.g., devices 120, 130, and 140) that are supplied with power by an exemplary power transmission line 110. Power line 110 may, for example, be a distribution line or feeder line in an electricity transmission grid delivering power to local users from a power-generating plant at a remote location. The devices may for example, be any type of electrical or electronic device. The devices may be any of a variety of industrial and/or household devices (e.g. electric motors, industrial fans, blowers and pumps, machine tools, lamps, household appliances, power tools, servers, computers, and disk drives, etc.). They may operate on direct current or on alternating current from a central electrical distribution grid. A device may include active and/or passive electrical components. A device may include circuits (e.g., transformers, frequency convertors, filters, etc.) that prepare or recondition power drawn from the power line and apply it to a device component. A device may include a device startup or activation circuit. The device startup or activation circuit may, for example, include an electronic or electro-mechanical power switch that is operable by user command or instruction. The device startup or activation circuit may include subcircuits for controlling operation of various components of the device.

To manage power draw or loading of power line 110, one or more of the connected devices (e.g., devices 120, 130, and 140) may include a power line sensor coupled to the device startup or activation circuit. The power line sensor may be configured to monitor one or more properties (e.g., voltage, current, phase, frequency, noise, etc) of power line 110. The device startup or activation circuit may slow or delay device startup in response to a property value measured by the power line sensor.

Figure 2:
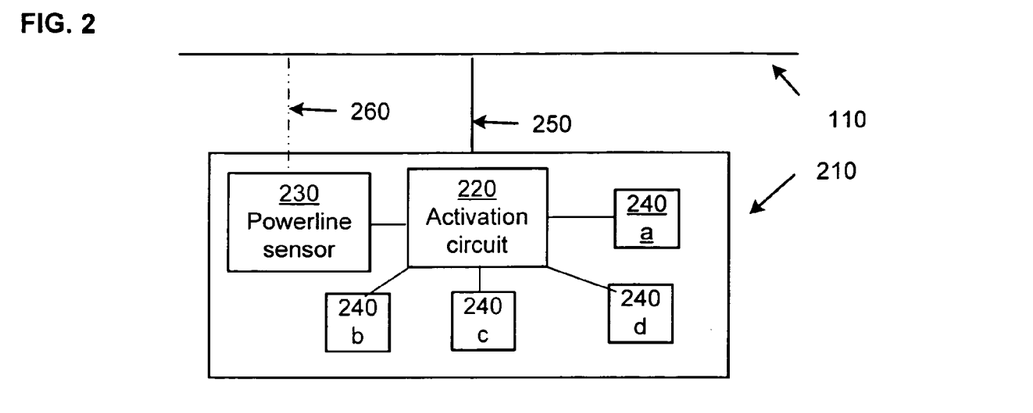
FIG. 2 is a block diagram illustrating components of an exemplary electrical device, in accordance with the principles of the solutions described herein.

FIG. 2 shows an exemplary electrical device 210 configured according to the principles disclosed herein. Electrical device 210 includes a device startup or activation circuit 220, which regulates or controls power supply to active and/or passive electrical device components (e.g., 240a-240d). Device startup or activation circuit 220 is coupled to a power line sensor 230. Sensor 230 may be configured to dynamically sense properties of a power supply line (e.g., power line 110) that is connected to electrical device 210. Device startup or activation circuit 220 may be configured to control or regulate startup or activation electrical device 210 (e.g., by timing or regulating operation of one or more device components 240a-240d) in response to sensed properties of the power supply line.

Sensor 230 may, for example, be configured to dynamically sense a voltage drop on the power supply line caused by transient high power demand by other devices (e.g., devices 130 and 140) coupled to the power supply line. Device startup or activation circuit 220 may be configured to slow or delay device startup or activation if the sensed voltage drop on the power supplies line occurs at or about device startup or activation and/or about a peak power draw by device 210 from the power supply line.

In other or additional versions, sensor 230 may be configured to sense voltage and/or current phase on the power supply line as an indicator of high power demand by other devices coupled to the power supply line. Additionally or alternatively, sensor 230 may be configured to sense high frequency power components on the power supply line as an indicator of high power demand by other devices coupled to the power supply line.

Sensor 230 may be configured to sense properties of the supply power line via of any physical or electrical connection (e.g., connection 250 or 260) to the supply power line. Sensor 230 may be configured to sense properties of the supply power line independent of any electrical supply connection (e.g., connection 250) to device 210. Sensor 230 may, for example, be configured to sense properties of the supply power line via wired, wireless, inductive, or capacitive link 260 even while electrical supply connection 250 is switched off. It will be understood that even though sensor 230 is referred to as 'sensor', it may be any suitable sensing arrangement. For example, sensor 230 may merely be a receiver which receives power line information derived or measured by other external sensors.

In response to a sensed drop or dip in the voltage on the power line, device startup or activation circuit 220 may be configured to slow or delay device startup or activation until the voltage on the power line recovers to a normal line voltage value or a threshold voltage value. Device startup or activation circuit 220 may include a reference a reference to the normal line voltage value or minimum threshold voltage value. The reference may, for example, an average power supply line voltage value. The normal line voltage value is a power supply line voltage value immediately before switching on the electrical device.

Figure 3:
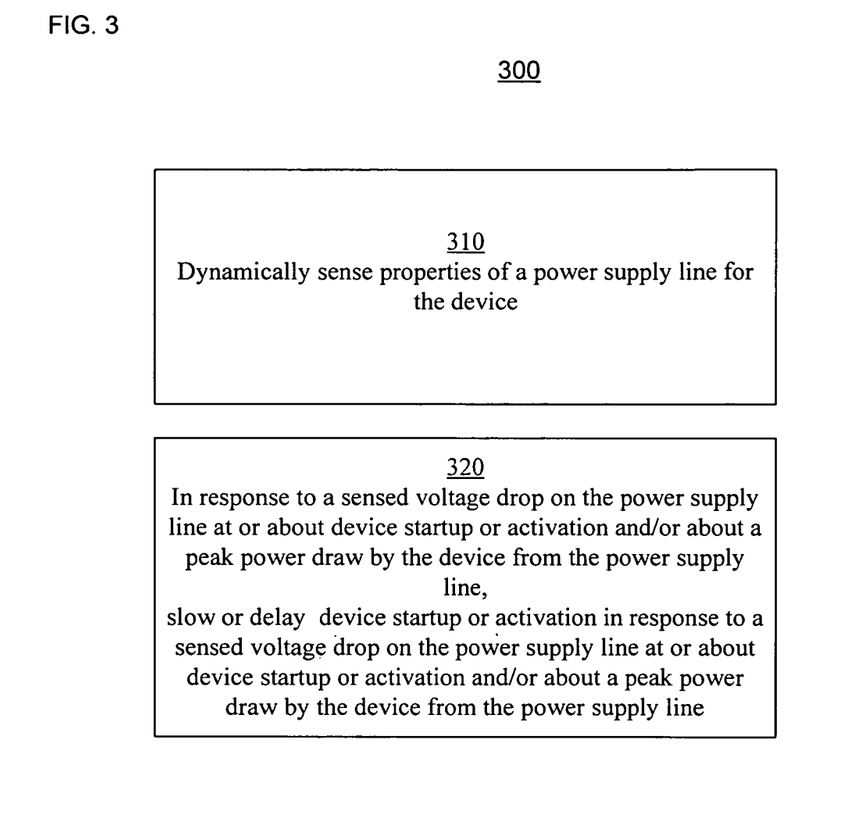
FIG. 3 is a flow diagram illustrating an exemplary method for controlled startup or activation of an electrical device connected to a power supply line.

FIG. 3 shows an exemplary method 300 for controlled startup or activation of an electrical device (e.g., device 120). Method 300 includes dynamically sensing properties of a power supply line for the device (310); and, in response to a sensed voltage drop on the power supply line at or about device startup or activation and/or about a peak power draw by the device from the power supply line, slowing or delaying device startup or activation (320).

In method 300, dynamically sensing properties of a power supply line (310) may include, for example, a voltage drop caused by high power demand by other devices coupled to the power supply line. The properties of the supply power line may be sensed while a physical electrical connection of the supply power line to the electrical device is switched off, for example, via other wireless or wired means. Dynamically sensing properties of a power supply line (310) may include sensing high frequency power components on the power supply line, and/or sensing voltage and/or current phase as indicators of high power demand by other devices coupled to the power supply line.

Further in method 300, slowing or delaying device startup or activation in response to a sensed voltage drop on the power supply line may include delaying device startup or activation until the voltage on the power line recovers to a normal line voltage value or other threshold value. The delay may be initiated or controlled by referencing the voltage drop to the normal line voltage value or other threshold value (e.g., an average power supply line voltage value, power supply line voltage value immediately before switching on the electrical device, etc.).

Figure 4:
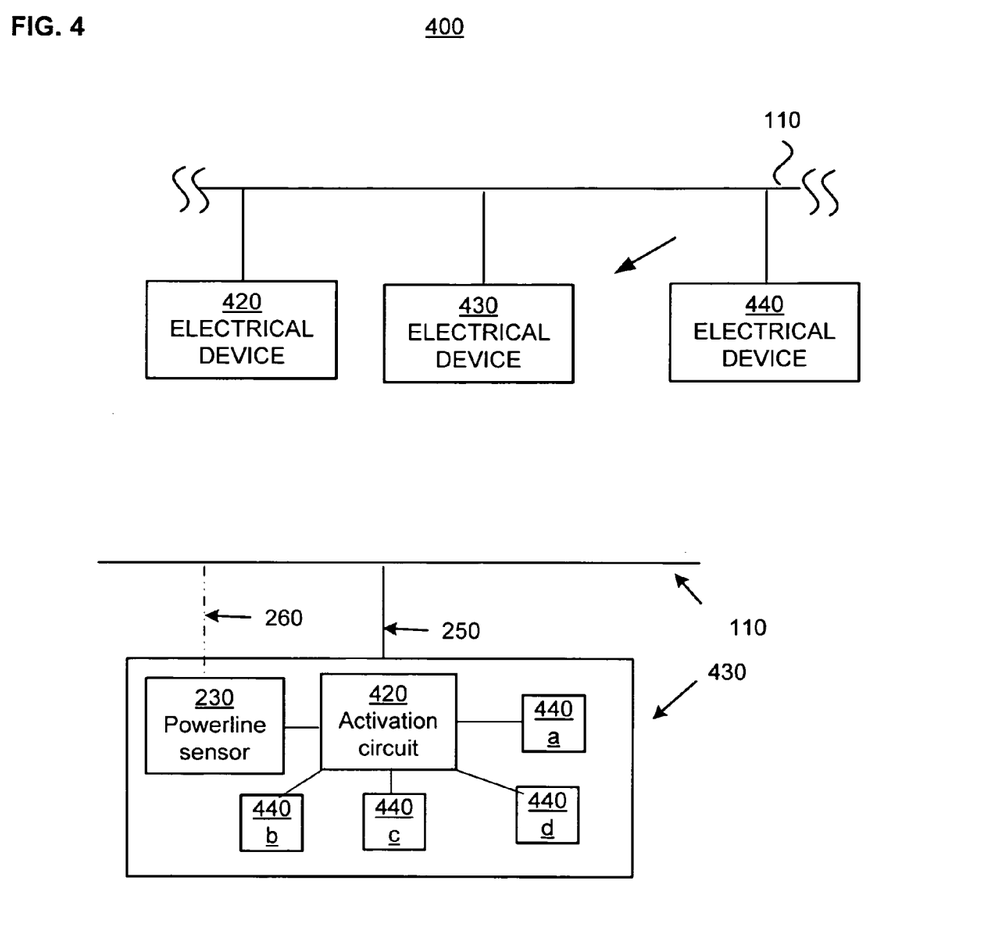
FIG. 4 is a schematic illustration of an exemplary electrical system having controlled device-startup and activation features for an electrical device therein, in accordance with the principles of the solutions described herein.

FIG. 4 shows an exemplary electrical system 400 having controlled device-startup and activation features. System 400 includes a plurality of electrical devices (e.g., devices 420-440, 510-520) coupled to a common power supply line (e.g., line 110). At least a first of the electrical devices (e.g., device 510, FIG. 5) has a signal-generating circuit that generates a signal indicative of power demand or use by the first device (e.g., device 510, FIG. 5). At least a second of the electrical devices (e.g., device 520, FIG. 5) includes an activation or startup circuit directly responsive to the generated signal indicative of power demand or use by the first device. The activation or startup circuit regulates or controls power use by the second device according to the signal indicative of power demand or use by the first device. The activation or startup circuit in electrical system 400 may be configured to allow startup or activation or a high-power operation mode of the second device only when the signal indicative of power demand by the first device has particular values (e.g., below, at or above a threshold value).

Figure 5:
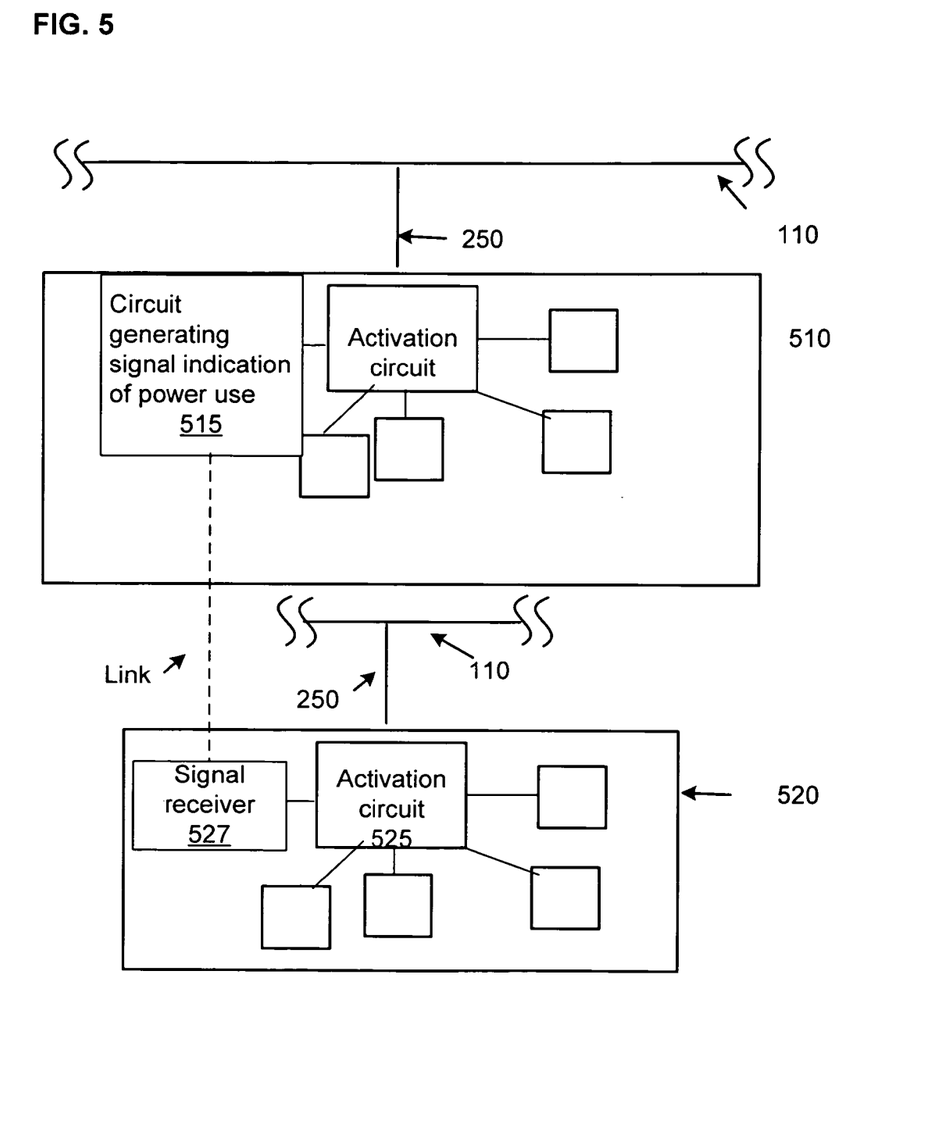
FIG. 5 is a block diagram illustrating exemplary devices that can be deployed in the electrical system of FIG. 4, in accordance with the principles of the solutions described herein; and, FIG. 6 is a flow diagram illustrating an exemplary method for regulating or controlling power use by a device in an electrical system having a plurality of electrical devices coupled to a power supply line, in accordance with the principles of the solutions described herein.

FIG. 5 shows exemplary devices 510 and 520 that may be deployed in electrical system 400. Device 510 has a signal-generating circuit 515 configured to generate a signal indicative of power demand or use by the device. Signal-generating circuit 515 may be configured to emit an indicative signal when the power demand or use by the first device exceeds a threshold value, or falls below the same or another threshold value. Device 520, which includes an activation or startup circuit 525, may include a signal receiver 527 or other means for receiving signals indicative of power demand or use by other devices. Activation or startup circuit 525 is coupled to signal receiver 527 or the other signal receiving means. Activation or startup circuit 525 may be configured to prevent or delay startup, activation or high-power operation modes of the device while the signal indicative of power demand or use by another device (e.g., device 510) is at or above a threshold value.

With renewed reference to FIG. 4, the signal indicative of power demand or use by the first device (e.g., device 510) may be transmitted other devices (e.g., 420-440, 520) over any suitable link. The signal may be broadcast or transmitted over electrical system 400 as an RF, ultrasonic or optical signal. Alternatively of additionally, the signal indicative of power demand or use by the first device (e.g., device 510) may be transmitted as an electrical signal modulating power supply line 110. The first device may transmit the signal indicative of power demand or use by the first device according to a collision avoidance protocol to avoid confusion as there may be other similarly configured devices in system 400 that also transmit respective signals indicative of device power demand or use over the power supply line. The collision avoidance protocol may, for example, include transmission of the signal a random time interval after a determination that no other signal indicative of power demand or use by another of the electrical devices is present or detected propagating on the power supply line. Alternatively, the collision avoidance protocol may include transmission of the signal a device-specific time interval after a determination that no other signal indicative of power demand or use by another of the electrical devices is present or detected propagating on the power supply line.

In a version of electrical system 400, one or more of the plurality of electrical devices (e.g., devices 420-440, 510-520, etc.) may be arranged to turn-on only in assigned time windows relative to turn-on of an initial one of the plurality of electrical devices or relative to an event affecting power draw from power supply line 110. Alternatively or additionally, a multiplicity of electrical devices may be arranged to turn-on in groups in a phased manner.

Figure 6:
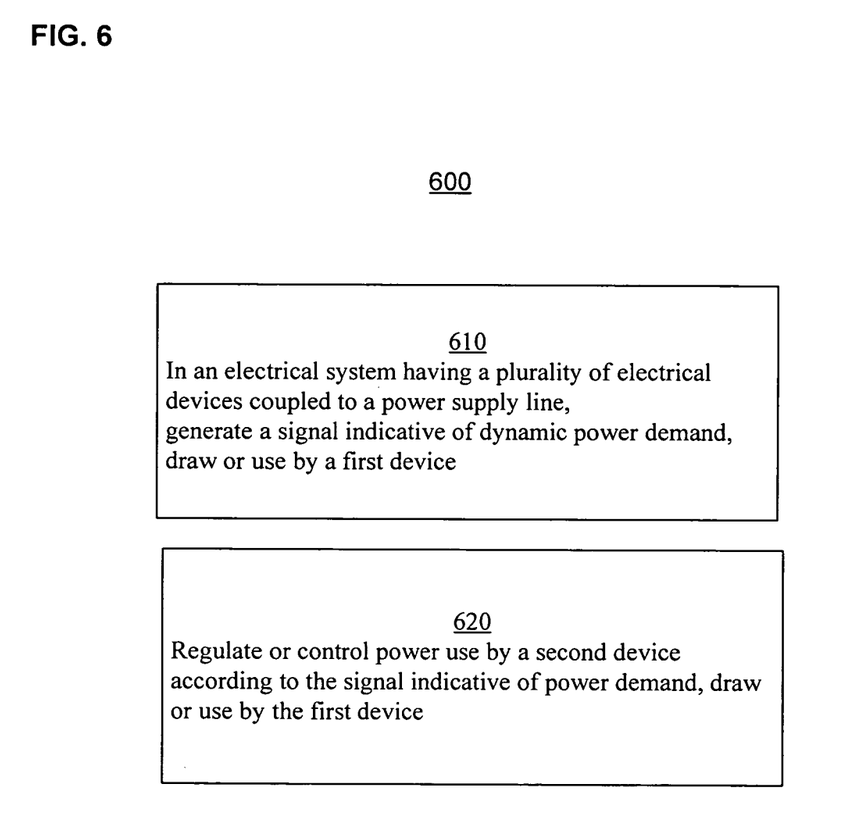

FIG. 6 shows an exemplary method 600 of regulating or controlling power use by a device according to the signal indicative of power demand or use by another device in an electrical system having a plurality of electrical devices coupled to a power supply line. Method 600 includes generating a signal indicative of dynamic power demand or use by a first device (610); and, regulating or controlling power use by a second device according to the signal indicative of power demand or use by the first device (620).

In method 600, generating a signal indicative of dynamic power demand or use by the first device (610) may include generating a signal by comparing the power demand or use by the first device with respect to a reference value. For example, respective indicative signals may be generated when the power demand is at or above a first threshold value and/or falls below a second threshold value.

Generating a signal indicative of dynamic power demand or use by the first device (610) may include transmitting or broadcasting an electrical, RF, ultrasonic or optical signal. Generating a signal indicative of dynamic power demand or use by the first device (610) may include transmitting the signal as an electrical signal modulating the power supply line. The method may include transmitting the electrical signal modulating the power supply line according to a suitable collision avoidance protocol that is designed, for example, to avoid collision or interference with signals indicative of dynamic power demand or use by other devices connected to the power supply line. A suitable collision avoidance protocol may, for example, include transmission of the signal a random time interval after a determination that no other signal indicative of power demand or use by another of the electrical devices is detected, present or propagating on the power supply line. Another suitable collision avoidance protocol may, for example, include transmission of the signal a device-specific time interval after a determination that no other signal indicative of power demand or use by another of the electrical devices is detected, present or propagating on the power supply line.

In method 600, regulating or controlling power use by the second device (620) may include limiting allowing startup or activation or a high-power operation mode of the second device only when the signal indicative of power demand by the first device is below a threshold value. Alternatively of additionally, regulating or controlling power use by the second device (610) may include turning off or reducing power use by the second device while the signal indicative of power demand or use by the first device is at or above a threshold value. Further, regulating or controlling power use by the second device (610) may additionally or alternatively include assigning one or more of the plurality of electrical devices to turn-on only in suitably selected time windows relative to turn-on of an initial one of the plurality of electrical devices or relative to an event affecting power draw from the power supply line, and/or arranging a multiplicity of electrical devices to turn-on in groups in a phased manner.

In the foregoing detailed description, reference is made to the accompanying drawings, which form a part hereof. In the drawings, similar symbols typically identify similar components, unless context dictates otherwise. The illustrative embodiments described in the summary, detailed description, drawings, and claims are not meant to be limiting. Other embodiments may be utilized, and other changes may be made, without departing from the spirit or scope of the subject matter presented here. Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processing circuits (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processing circuits (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.). Further, those skilled in the art will recognize that the mechanical structures disclosed are exemplary structures and many other forms and materials may be employed in constructing such structures.

In a general sense, those skilled in the art will recognize that the various embodiments described herein can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems for generation, transmission and distribution of electrical power, a communications system (e.g., a networked system, a telephone system, a Voice over IP system, wired/wireless services, etc.).

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. An electrical device, the device comprising:
   a device startup or activation circuit;
   a power line sensor coupled to the device startup or activation circuit; and
   a signal-generating circuit configured to transmit a signal including information related to an amount of power used by the electrical device, wherein the signal is configured to be received by one or more startup or activation circuits of one or more electrical devices,
   wherein the power line sensor is configured to dynamically sense properties of a power supply line for the device, and wherein the device startup or activation circuit is configured to slow or delay device startup or activation upon a sensed voltage drop on the power supply line at or about device startup or activation and/or about a peak power draw by the device from the power supply line.

2. The electrical device of claim 1, wherein the power line sensor is configured to sense a voltage drop on the power supply line caused by transient high power demand by other devices coupled to the power supply line.

3. The electrical device of claim 1, wherein the power line sensor is configured to sense voltage and/or current phase on the power supply line as an indicator of high power demand by other devices coupled to the power supply line.

4. The electrical device of claim 1, wherein the power line sensor is configured to sense high frequency power components on the power supply line as an indicator of high power demand by other devices coupled to the power supply line.

5. The electrical device of claim 1, wherein the power line sensor is configured to sense properties of the supply power line while a connection of the supply power line to the electrical device is switched off.

6. The electrical device of claim 1, wherein the device startup or activation circuit is configured to delay device startup or activation until the voltage on the power line recovers to a normal line voltage value.

7. The electrical device of claim 6, wherein the device startup or activation circuit includes a reference to the normal line voltage value.

8. The electrical device of claim 6, wherein the normal line voltage value is an average power supply line voltage value.

9. The electrical device of claim 6, wherein the normal line voltage value is a power supply line voltage value immediately before switching on the electrical device.

10. The electrical device of claim 1, wherein the signal-generating circuit is configured to transmit the signal by modulating the power supply line.

11. The electrical device of claim 1, wherein the signal is configure to cause the one or more startup or activation circuits to control power use of an associated electrical device based on the signal.

12. A method for controlled startup or activation of an electrical device, the method comprising:
    dynamically sensing properties of a power supply line for the device;

slowing or delaying device startup or activation in response to a sensed voltage drop on the power supply line at or about device startup or activation and/or about a peak power draw by the device from the power supply line; and transmitting a signal including information related to an amount of power used by the electrical device, wherein the signal is configured to be received by one or more startup or activation circuits of one or more electrical devices.

13. The method of claim 12, wherein dynamically sensing properties of a power supply line comprises sensing a voltage drop on the power supply line caused by transient high power demand by other devices coupled to the power supply line.

14. The method of claim 12, wherein dynamically sensing properties of a power supply line comprises sensing high frequency power components on the power supply line as an indicator of high power demand by other devices coupled to the power supply line.

15. The method of claim 12, wherein dynamically sensing properties of a power supply line comprises sensing voltage and/or current phase on the power supply line as an indicator of high power demand by other devices coupled to the power supply line.

16. The method of claim 12, wherein dynamically sensing properties of a power supply line comprises sensing properties of the supply power line while a connection of the supply power line to the electrical device is switched off.

17. The method of claim 12, wherein slowing or delaying device startup or activation in response to a sensed voltage drop on the power supply line comprises
delaying device startup or activation until the voltage on the power line recovers to a normal line voltage value.

18. The method of claim 12, wherein slowing or delaying device startup or activation in response to a sensed voltage drop on the power supply line comprises referring to a normal line voltage value.

19. The method of claim 18, wherein the normal line voltage value is an average power supply line voltage value.

20. The method of claim 18, wherein the normal line voltage value is a power supply line voltage value immediately before switching on the electrical device.

* * * * *